United States Patent
Lee et al.

(10) Patent No.: US 10,264,625 B2
(45) Date of Patent: Apr. 16, 2019

(54) ACTIVATING HIGH-SPEED TRAIN CONFIGURATIONS IN WIRELESS COMMUNICATIONS

(71) Applicant: QUALCOMM Incorporated, San Diego, CA (US)

(72) Inventors: Heechoon Lee, San Diego, CA (US); June Namgoong, San Diego, CA (US); Peter Gaal, San Diego, CA (US); Jae Ho Ryu, San Diego, CA (US); Hao Xu, Beijing (CN); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/711,795

(22) Filed: Sep. 21, 2017

(65) Prior Publication Data
US 2018/0213595 A1    Jul. 26, 2018

Related U.S. Application Data

(60) Provisional application No. 62/450,780, filed on Jan. 26, 2017.

(51) Int. Cl.
*H04W 84/00* (2009.01)
*H01Q 1/32* (2006.01)
(Continued)

(52) U.S. Cl.
CPC ........ *H04W 84/005* (2013.01); *H01Q 1/3216* (2013.01); *H04W 48/12* (2013.01); *H04W 74/006* (2013.01)

(58) Field of Classification Search
USPC .................................................. 455/517–521
See application file for complete search history.

(56) References Cited

U.S. PATENT DOCUMENTS

| 2013/0114756 | A1* | 5/2013 | Jia ............................. H04J 11/00 375/295 |
| 2017/0311290 | A1* | 10/2017 | Adjakple .............. H04W 76/18 |
| 2018/0219701 | A1* | 8/2018 | Seo ...................... H04L 25/0224 |

OTHER PUBLICATIONS

Intel Corporation: "Discussion on MCS and Scenario Selection, and UE Demodulation Performance for Bidirectional HST SFN channels", 3GPP Draft; R4-165033, 3rd Generation Partnership Project (3GPP), Mobile Competence Centre; 650, Route Des Lucioles; F-06921 Sophia-Antipolis Cedex; France, vol. RAN WG4, No. Gothenburg, Sweden; Aug. 22, 2016-Aug. 26, 2016, Aug. 12, 2016 (Aug. 12, 2016), XP051143109, 6 pages, Retrieved from the Internet: URL:http://www.3gpp.org/ftp/tsg_ran/WG4_Radio/TSGR4_80/Docs/ [retrieved on Aug. 12, 2016].

(Continued)

*Primary Examiner* — Fayyaz Alam
(74) *Attorney, Agent, or Firm* — Arent Fox LLP

(57) ABSTRACT

Aspects of the present disclosure describe activating a high speed train (HST) configuration for communicating with a cell in a HST based communications environment. A first signal including an HST activate indication to activate a HST configuration can be received from a cell. The HST configuration can be activated based at least in part on the HST activate indication. One or more subsequent signals can be communicated with the cell using the HST configuration based at least in part on the HST activate indication.

30 Claims, 6 Drawing Sheets

(51) Int. Cl.
*H04W 48/12* (2009.01)
*H04W 74/00* (2009.01)

(56) References Cited

OTHER PUBLICATIONS

Intel Corporation: "Enabling of High Speed Train Indication", 3GPP Draft; R2-166273_HST, 3rd Generation Partnership Project (3GPP), Mobile Competence Centre; 650, Route Des Lucioles; F-06921 Sophia-Antipolis Cedex ; France, vol. RAN WG2, No. Kaohsiung; Oct. 10, 2016-Oct. 14, 2016, Oct. 9, 2016 (Oct. 9, 2016), XP051150863, 13 pages, Retrieved from the Internet URL:http://www.3gpp.org/ftp/Meetings_3GPPSYNC/RAN2/Docs/ [retrieved on Oct. 9, 2016].
International Search Report and Written Opinion—PCT/US2018/015313—ISA/EPO—dated Mar. 29, 2018.
J. Sanchez et al: "UTRA Radio Protocols" In: "UMTS", Jan. 1, 2007 (Jan. 1, 2007), Wiley, ISTE, London, UK, XP055459566, ISBN: 978-1-905209-71-2, pp. 145-186, DOI: 10.1002/9780470612279.ch7.

\* cited by examiner

ACTIVATING HIGH-SPEED TRAIN CONFIGURATIONS IN WIRELESS COMMUNICATIONS

CLAIM OF PRIORITY UNDER 35 U.S.C. § 119

The present application for patent claims priority to Provisional Application No. 62/450,780, entitled "ACTIVATING HIGH-SPEED TRAIN CONFIGURATIONS IN WIRELESS COMMUNICATIONS" filed Jan. 26, 2017, which is assigned to the assignee hereof and hereby expressly incorporated by reference herein for all purposes.

BACKGROUND

Aspects of the present disclosure relate generally to wireless communication systems, and more particularly, to communications on high-speed trains (HSTs).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

HST systems can be equipped to support wireless communications for user equipment (UE) aboard the HST. For example, a HST system can include a plurality of remote radio heads (RRHs) for one or more base stations to facilitate UE communications with the base stations using the RRHs. The RRHs can be located near the HST track, for example, and can utilize a single frequency network (SFN) to communicate with one or more UEs to minimize a number of handovers of the UE among the RRHs. In an example, 5G NR may (or may be required to) support up to 500 kilometers per hour (km/h) HSTs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for activating a high speed train (HST) configuration for communicating with a cell in a HST based communications environment is provided. The method includes receiving, by a user equipment (UE) from the cell, a first signal including an HST activate indication to activate a HST configuration, activating, by the UE based at least in part on the HST activate indication, the HST configuration, and communicating, by the UE based at least in part on the HST activate indication, one or more subsequent signals with the cell using the HST configuration.

In another example, a method for activating a HST configuration for communicating with a cell on a HST is provided. The method includes transmitting, from a cell to a UE, a first signal including an HST activate indication to activate a HST configuration, and communicating, by the cell with the UE, one or more subsequent signals based on the HST configuration.

In another example, an apparatus for activating a HST configuration for communicating with a cell in a HST based communications environment is provided. The apparatus includes a transceiver for communicating one or more wireless signals via one or more antennas, a memory configured to store instructions, and one or more processors communicatively coupled with the transceiver and the memory. The one or more processors are configured to receive, from the cell, a first signal including an HST activate indication to activate a HST configuration, activate, based at least in part on the HST activate indication, the HST configuration, and communicate, based at least in part on the HST activate indication, one or more subsequent signals with the cell using the HST configuration.

In another example, an apparatus for activating a HST configuration for communicating with a cell on a HST is provided. The apparatus includes a transceiver for communicating one or more wireless signals via one or more antennas, a memory configured to store instructions, and one or more processors communicatively coupled with the transceiver and the memory. The one or more processors are configured to transmit, to a user equipment (UE), a first signal including an HST activate indication to activate a HST configuration, and communicate, with the UE, one or more subsequent signals based on the HST configuration In a further example, an apparatus for wireless communication is provided that includes means for performing the operations of methods described herein. In yet another example, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
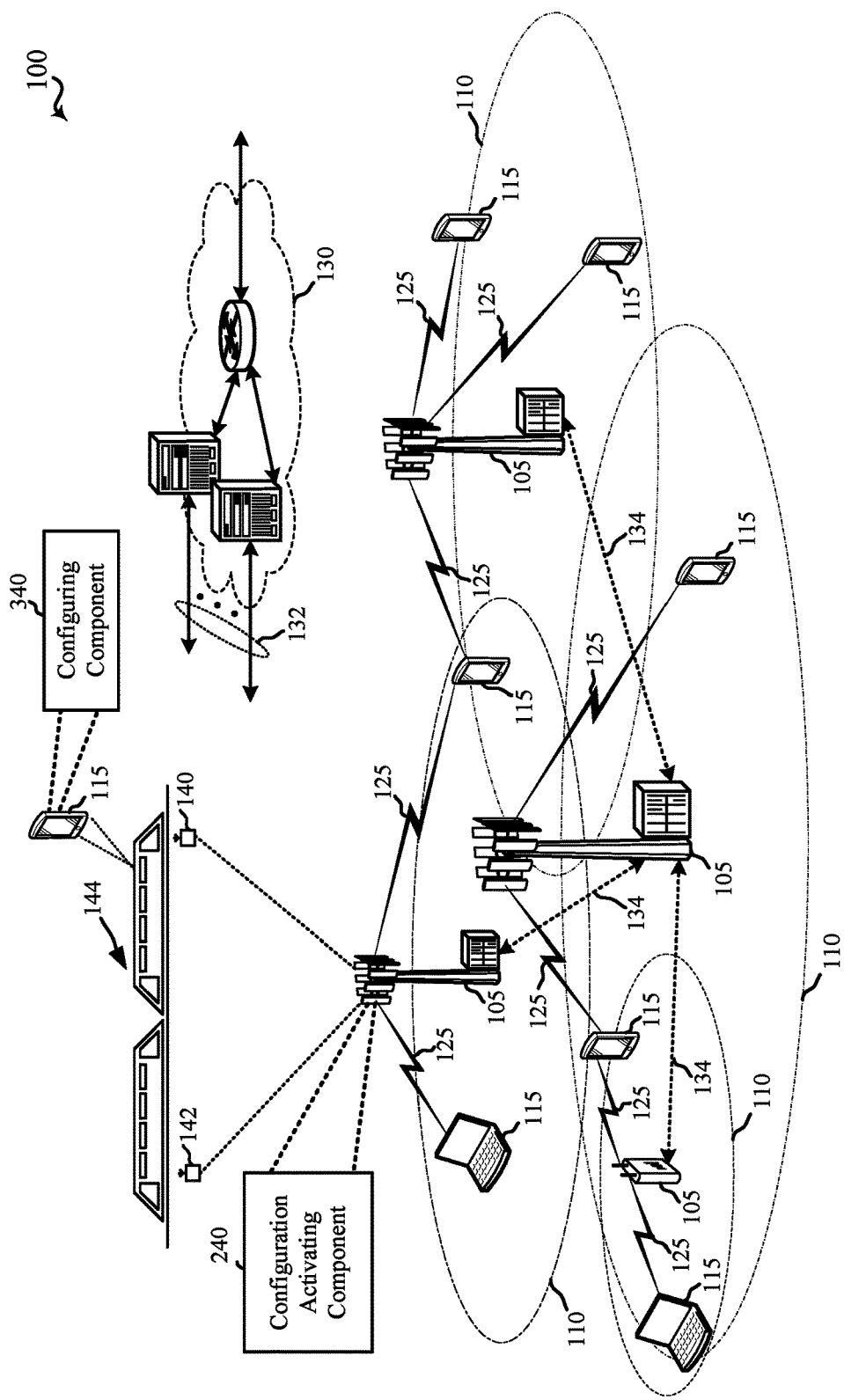
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to supporting wireless communications in high speed train (HST) systems. Due to the configuration of HST systems using multiple remote radio heads (RRHs) to support user equipment (UE) moving at a high speed, modifying certain configuration parameters related to wireless communications may allow for supporting certain speeds of UE movement. For example, a denser demodulation reference signal (DM-RS) in time, as compared to a typical DM-RS pattern for wireless communication technologies, may provide enhanced support for UEs moving at high speed.

Accordingly, for example, a UE can receive an indication to activate a HST configuration, where the HST configuration can include one or more parameters for performing wireless communications in a HST system. For example, the indication may include a bit indicator and/or may include the HST configuration indicating the one or more parameters being modified. In an example, the UE may receive the indication from a base station, and/or an associated RRH, in a physical broadcast channel (PBCH) signal, such as a master information block (MIB), system information block (SIB), etc. In another example, the UE may receive the indication from the base station, and/or associated RRH, as part of a downlink control information (DCI) message received in a downlink control channel. In any case, the UE can activate the HST configuration based on the received indication, which may include modifying one or more wireless communication parameters, for a period of time to facilitate communicating (e.g., processing received signals and/or generating signals for transmission based on the one or more parameters) in the HST system.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, a base station 105 may also include one or more remotely located transceivers 140, 142, which may be wired or wirelessly coupled with the base station 105 for transmitting/receiving associated signaling from/to the base station 105 at a different location. In an example, transceivers 140, 142 may be RRHs, relays, etc. configured to facilitate communications between one or more UEs, or other devices, and base station 105. In another example, transceivers 140, 142 may include one or more small cells in communication with core network 130 to facilitate wireless communications between the core network 130 and one or more UEs. In a specific example, the transceivers 140, 142 may be positioned in an HST system to allow UEs aboard a HST 144 to communicate with core network 130 using the transceivers 140, 142 (e.g., as RRHs or relays to base station 105 or otherwise).

Figure 2:
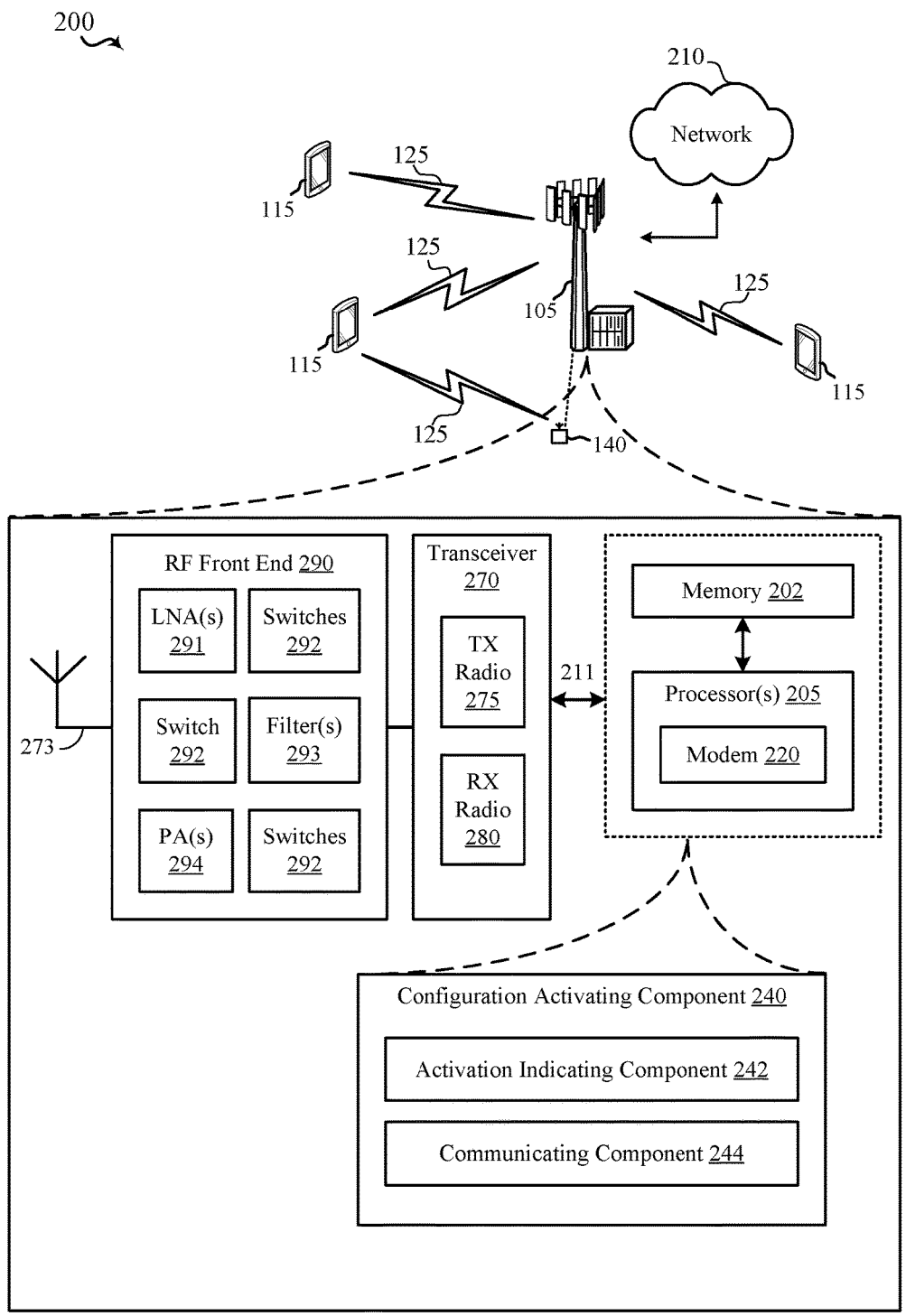
FIG. 2 is a block diagram illustrating an example of a base station, in accordance with various aspects of the present disclosure.
Figure 3:
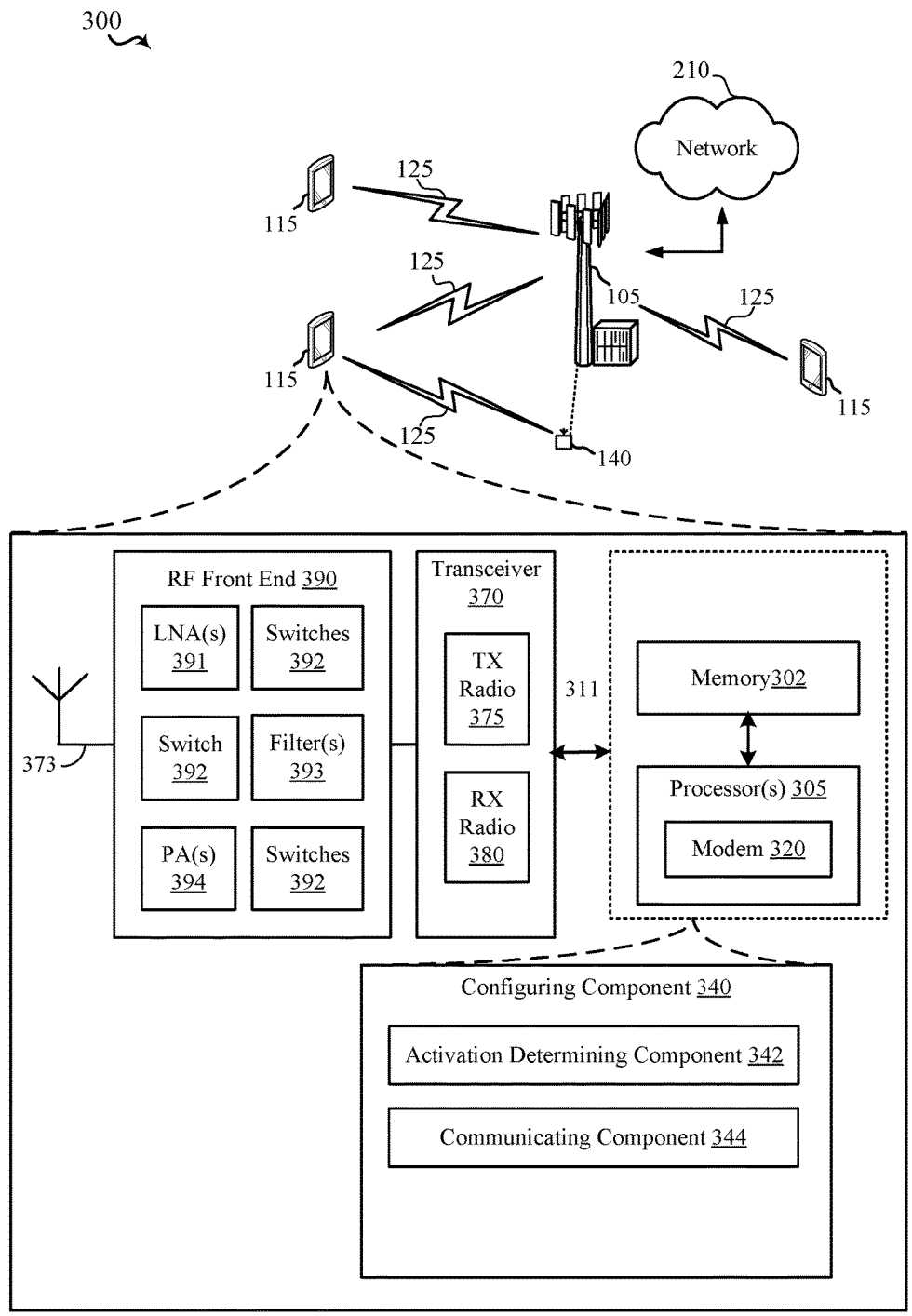
FIG. 3 is a block diagram illustrating an example of a UE, in accordance with various aspects of the present disclosure.
Figure 4:
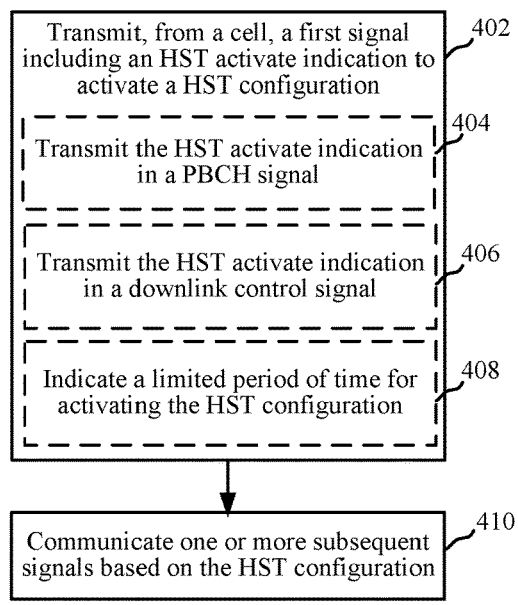
FIG. 4 is a flow chart illustrating an example of a method for transmitting a high speed train (HST) activate indication, in accordance with various aspects of the present disclosure.
Figure 5:
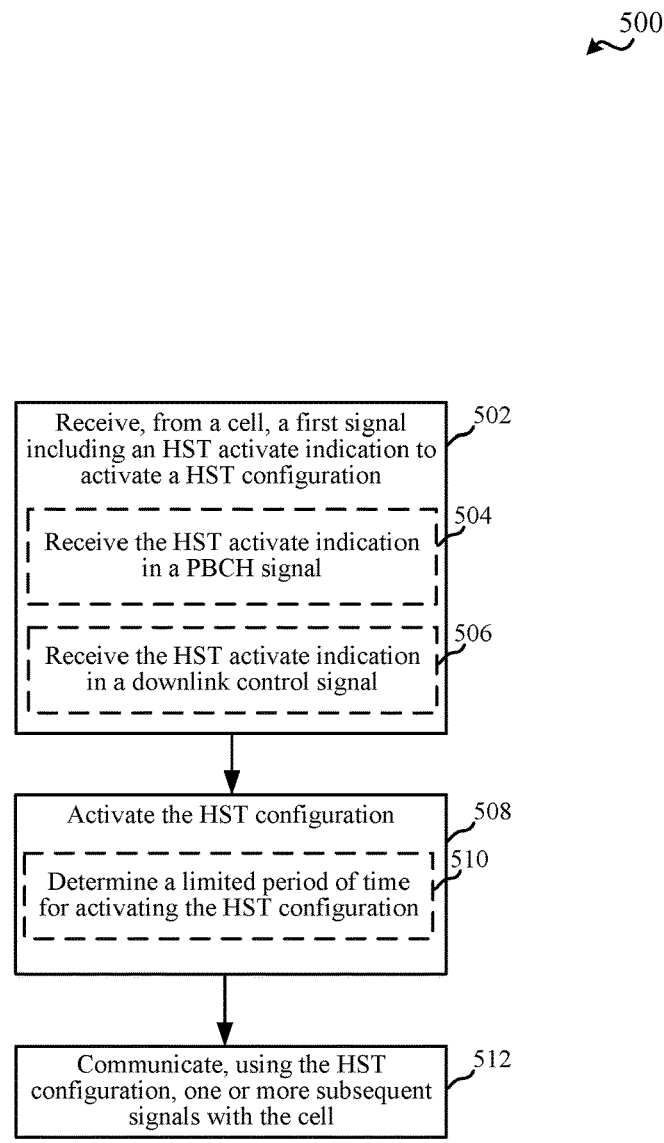
FIG. 5 is a flow chart illustrating an example of a method for receiving a HST activate indication, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. Additionally, as described, the base station 105 can be connected to a transceiver 140, which may be a RRH, relay, etc. used to forward signals transmitted by the base station 105 to one or more UEs 115 and/or forward signals transmitted by the one or more UEs 115 to the base station 105. The UEs 115 may be examples of the UEs described in the present disclosure that are configured to receive an indication to activate an HST configuration for communicating with a base station 105. Moreover the base station 105 may be an example of the base stations described in the present disclosure (e.g., eNB, gNB, etc. providing one or more macrocells, small cells, etc., RRHs or relays thereof, etc.) that are configured to communicate according to an HST configuration and/or to instruct one or more UEs to activate a HST configuration.

In an aspect, the base station in FIG. 2 may include one or more processors 205 and/or memory 202 that may operate in combination with a configuration activating component 240 to perform the functions, methodologies (e.g., method 400 of FIG. 4), or other methods presented in the present disclosure. In accordance with the present disclosure, the configuration activating component 240 may include an activation indicating component 242 for communicating an indication to activate an HST configuration, and/or a communicating component 244 for communicating with one or more UEs 115 based on parameters corresponding to the HST configuration.

The one or more processors 205 may include a modem 220 that uses one or more modem processors. The various functions related to the configuration activating component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the configuration activating component 240. In another example, configuration activating component 240 may operate at one or more communication layers, such as a PDCP layer, an RLC layer, etc., to indicate activation of the HST configuration and/or communicate based on parameters of the HST configuration.

In some examples, the configuration activating component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the configuration activating component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220. Additionally, the base station 105 may include a remotely located transceiver 140, such as a RRH, relay, etc., which can transmit signals that are transmitted by the base station 105 in other locations over similar communication links 125 to one or more UEs 115.

The base station 105 in FIG. 2 may further include a memory 202, such as for storing data used herein and/or local versions of applications or configuration activating component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining configuration activating component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 6. Similarly, the memory 202 may correspond to the memory described in connection with the base station in FIG. 6.

Referring to FIG. 3, a block diagram 300 is shown that includes a portion of a wireless communications system having multiple UEs 115 in communication with a base station 105 via communication links 125, where the base station 105 is also connected to a network 210. Additionally, as described, the base station 105 can be connected to a transceiver 140, which may be a RRH, relay, etc. used to forward signals transmitted by the base station 105 to one or more UEs 115 and/or forward signals transmitted by the one or more UEs 115 to the base station 105. The UEs 115 may be examples of the UEs described in the present disclosure that are configured to receive an indication to activate an HST configuration for communicating with a base station 105. Moreover the base station 105 may be an example of the base stations described in the present disclosure (e.g., eNB, gNB, etc. providing one or more macrocells, small cells, etc., RRHs or relays thereof, etc.) that are configured to communicate according to an HST configuration and/or instruct one or more UEs to activate a HST configuration.

In an aspect, the UE 115 in FIG. 3 may include one or more processors 305 and/or memory 302 that may operate in combination with a configuring component 340 to perform the functions, methodologies (e.g., method 500 of FIG. 5), or other methods presented in the present disclosure. In accordance with the present disclosure, the configuring component 340 may include an activation determining component 342 for determining to activate an HST configuration for communicating with one or more base stations 105 or corresponding cells, and/or a communicating component 344 for communicating with the one or more base stations 105 or corresponding cells using one or more parameters of the HST configuration.

The one or more processors 305 may include a modem 320 that uses one or more modem processors. The various functions related to the configuring component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the configuring component 340. In another example, configuring component 340 may operate at one or more communication layers, such as a PDCP layer, an RLC layer, etc., to determine whether to activate the HST configuration and/or communicate based on one or more parameters of the HST configuration.

In some examples, the configuring component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the configuring component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or configuring component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining configuring component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 6. Similarly, the memory 302 may correspond to the memory described in connection with the UE in FIG. 6.

FIG. 4 illustrates a flow chart of an example of a method 400 for transmitting (e.g., by a base station, via remotely located transceiver, such as a RRH, relay, etc.) signals based on an HST configuration.

At Block 402, the base station can transmit, from a cell, a first signal including an HST activate indication to activate a HST configuration. In an aspect, activation indicating component 242, e.g., in conjunction with processor(s) 205, memory 202, transceiver 270, and/or configuration activating component 240, can transmit, from the cell (e.g., to UE 115), the first signal including the HST activate indication to activate the HST configuration. For example, activation indicating component 242 can transmit the first signal with the HST activate indication as a bit indicator (e.g., indicating one value to activate an HST configuration and/or another value to not activate, or deactivate, the HST configuration). In another example, the HST activate indication can be an indicator where the presence of the indicator indicates to activate the HST configuration (e.g., and/or where the absence of the indicator indicates to not activate, or deactivate, the HST configuration), etc.

In this example, the UE 115 may know (e.g., store in a volatile or non-volatile memory) or may otherwise have been previously configured (e.g., by the base station 105 or other network entity) with one or more HST configuration parameters to utilize when the HST configuration is activated. In another example, activation indicating component 242 can transmit the HST activate indication as, or including, the HST configuration and/or one or more related parameters. Thus, for example, it may be possible that the HST configuration and/or related parameters (or corresponding parameter values) can change over time. In an example, base station 105 can indicate any such modifications to the UE 115 using broadcast or dedicated signaling. For example, the signaling may include one or more updated HST activate indications with modified parameters or parameter values (or indications of how to modify the parameters/values), or other signaling outside of the HST activate indicating process.

For instance, the HST configuration can relate to one or more parameters the UE 115 can set or modify for utilizing in communicating in a HST system. One example of a parameter may include a DM-RS pattern, which may be increased in density for HST systems (e.g., HST configurations may specify to use a more dense DM-RS pattern than non-HST systems). Thus, the HST activate indication can be used by the UE 115 to increase density for transmitting a DM-RS to the base station 105 to allow the base station 105 to properly demodulate communications related to the UE 115. For example, increasing density for transmitting the DM-RS can generally include increasing a number of frequency resources over a period of time that are used for transmitting the DM-RS. In an example, increasing the number of frequency resources may include increasing a number of symbols (e.g., OFDM symbols, SCOFDM symbols, etc.) used for DM-RS transmission in a slot or subframe, increasing a number of subcarriers or tones in a given symbol used for DM-RS transmission, etc. In LTE, for example, DM-RS is typically transmitted using frequency resources of two symbols in a subframe of a corresponding data channel (e.g., physical uplink shared channel (PUSCH)). In this example, the HST configuration can indicate to use additional symbols in the subframe, which may include an indication of a number of symbols to use, an indication of indices of symbols to use in the subframe (e.g., in addition or alternatively to the two symbols typically used), etc.

In an example, in transmitting the first signal including the HST activate indication at Block 402, the base station may optionally, at Block 404, transmit the HST activate indication in a PBCH signal. In an aspect, activation indicating component 242, e.g., in conjunction with processor(s) 205, memory 202, transceiver 270, and/or configuration activating component 240, can transmit the HST activate indication in the PBCH signal. For example, activation indicating component 242 can transmit the HST activate indication in a MIB or SIB in the PBCH signal. In another example, in transmitting the first signal including the HST activate indication at Block 402, the base station may optionally, at Block 406, transmit the HST activate indication in a downlink control signal. In an aspect, activation indicating component 242, e.g., in conjunction with processor(s) 205, memory 202, transceiver 270, and/or configuration activating component 240, can transmit the HST activate indication in the downlink control signal. For example, activation indicating component 242 can transmit the HST activate indication in, or based on, a selected DCI format indicated and/or utilized in communicating the downlink control signal. For example, a certain DCI format indicated in the downlink control channel can be the HST activate indication.

In an example, in transmitting the first signal including the HST activate indication at Block 402, the base station may optionally, at Block 408, indicate a limited period of time for activating the HST configuration. In an aspect, activation indicating component 242, e.g., in conjunction with processor(s) 205, memory 202, transceiver 270, and/or configuration activating component 240, can indicate the limited period of time for activating the HST configuration. For example, configuration activating component 240 may indicate the limited time period in the HST activate indication and/or in one or more corresponding parameters (e.g., in the MIB, SIB, DCI format, etc.). In another example, configuration activating component 240 may indicate the limited period of time in other signaling to the UE 115. In one example, the UE 115 may signal one or more conditions from which activation indicating component 242 may determine the limited period of time. For example, the limited period of time may correspond to a one or more subframes, one or more slots (e.g., of a subframe or otherwise, which may depend on the radio access technology), or one or more symbols (e.g., of a subframe or otherwise, which may depend on the radio access technology), etc.

In a specific example, the UE 115 may indicate the one or more conditions as a speed the UE 115 is moving (e.g., speed of the HST), which can be determined based on detecting location of the UE 115 in multiple periods of time (e.g., via global positioning system (GPS) receiver), based on receiving the speed from the HST, etc. In another example, the UE 115 may indicate the one or more conditions as an experienced Doppler shift, etc. In any case, for example, configuration activating component 240 may set and/or indicate the limited period of time based on (e.g., as a function of) the speed, experience Doppler shift, etc. as reported. In other examples, the UE 115 may specify the limited period of time to the base station 105 (e.g., based on determining its speed, experienced Doppler shift, etc.), and the configuration activating component 240 may receive the limited period of time and activate the HST configuration for the limited period of time. In an example, the base station 105, and/or each RRH, relay, etc., can transmit an independent reference signal to allow the UE 115 to determine the Doppler shift per base station, RRH, relay, etc. The base station 105, and/or each RRH, relay, etc., however, can transmit data (e.g., a physical downlink shared channel (PDSCH)) with DM-RS using single frequency network (SFN)) to minimize a number of handovers of the UE 115 among base stations 105 and/or related RRHs, relays, etc.

In method 400, at Block 410, the base station may communicate one or more subsequent signals based on the HST configuration. In an aspect, communicating component 244, e.g., in conjunction with processor(s) 205, memory 202, transceiver 270, and/or configuration activating component 240, can communicate the one or more subsequent signals based on the HST configuration. In one example, communicating component 244 can transmit one or more subsequent signals to the UE 115 and/or receive one or more subsequent signals from the UE 115 based on the HST configuration. Thus, in one example, communicating component 244 may also activate a HST configuration at the base station 105 to facilitate communicating the one or more subsequent signals according to the HST configuration.

In a specific example, where activation indicating component 242 includes the HST activate indication in a MIB, the one or more subsequent signals communicated based on the HST configuration (e.g., at Block 410) can include one or more SIBs in the PBCH and/or subsequent uplink or downlink control or data signals. In another specific example, where activation indicating component 242 includes the HST activate indication in a SIB, the one or more subsequent signals communicated based on the HST configuration (e.g., at Block 410) can include one or more subsequent SIBs in the PBCH and/or subsequent uplink or downlink control or data signals. In another specific example, where activation indicating component 242 includes the HST activate indication in a downlink control signal, the one or more subsequent signals communicated based on the HST configuration (e.g., at Block 410) can include one or more subsequent uplink or downlink control or data signals. Additionally, in an example, communicating component 244 can continue to apply the HST configuration to the subsequent received or transmitted signals for the limited period of time, where the limited period of time is defined and/or indicated to the UE 115, as described.

FIG. 5 illustrates a flow chart of an example of a method 500 for activating (e.g., by a UE) a HST configuration for communicating with a base station.

In method 500, at Block 502, the UE can receive, from a cell, a first signal including an HST activate indication to activate a HST configuration. In an aspect, activation determining component 342, e.g., in conjunction with processor(s) 305, memory 302, transceiver 370, and/or configuring component 340, can receive, from the cell (e.g., a cell of a base station 105 or a related RRH, relay, small cell, etc.), the first signal including the HST activate indication to activate the HST configuration. As described, activation determining component 342 may receive the HST activate indication as a bit indicator, a value whose presence indicates to activate the HST configuration (or whose absence indicates not to activate, or to deactivate, the HST configuration), etc. In these examples, the UE 115 may know or may otherwise have been configured with the one or more parameters to modify or otherwise utilize in activating the HST configuration. In another example, the HST activate indication may include the one or more parameters for activating the HST configuration, etc. Additionally, the HST configuration may be modifiable and/or configurable by the base station 105 or other network component, as described. Furthermore, as described in an example, one example of a parameter of the HST configuration may include a DM-RS pattern, which may be increased in density for HST systems.

In an example, in receiving the first signal including the HST activate indication, the UE may optionally, at Block 504, receive the HST activate indication in a PBCH signal. In an aspect, activation determining component 342, e.g., in conjunction with processor(s) 305, memory 302, transceiver 370, and/or configuring component 340, can receive the HST activate indication in the PBCH signal, such as in a MIB or SIB. In another example, in receiving the first signal including the HST activate indication, the UE may optionally, at Block 506, receive the HST activate indication in a downlink control signal. In an aspect, activation determining component 342, e.g., in conjunction with processor(s) 305, memory 302, transceiver 370, and/or configuring component 340, can receive the HST activate indication in the downlink control signal, such as in a DCI format. For example, a certain DCI format indicated in the downlink control channel or one or more parameters sent with the DCI format can be the HST activate indication.

In method 500, at Block 508, the UE can activate the HST configuration. In an aspect, configuring component 340, e.g., in conjunction with processor(s) 305, memory 302, and/or transceiver 370, can activate the HST configuration. For example, configuring component 340 may set or modify one or more parameters or related values for performing wireless communications in a HST system, such as a DM-RS density or other parameters/values, as described. In one example, in activating the HST configuration at Block 508, the UE may optionally, at Block 510, determine a limited period of time for activating the HST configuration. In an aspect, configuring component 340, e.g., in conjunction with processor(s) 305, memory 302, and/or transceiver 370, can determine the limited period of time for activating the HST configuration and may activate the HST configuration for the limited period of time. After the limited period of time, for example, the configuring component 340 can deactivate the HST configuration, which may include modifying one or more parameters to its original value for communicating with a base station.

In one example, configuring component 340 can determine the limited period of time based on one or more observed parameters, such as a speed at which the UE 115 is moving, an experienced Doppler shift, etc. For instance, the base station 105 and/or a remotely located transceiver 140 (e.g., a related RRH, relay, etc.) may transmit independent reference signals to allow the UE 115 to perform Doppler tracking per each base station 105 and/or related RRHs, relays, etc., though a given base station 105 and/or related RRHs, relays, etc. can utilize a single frequency network to communicate data signals (e.g., PDSCH with DM-RS) to the UE 115 to minimize a number of handovers. In this example, configuring component 340 can activate the HST configuration for the limited period of time (and/or may indicate the limited period of time to the base station 105, which can transmit according to the HST configuration for the indicated period of time). In another example, activation determining component 342 can receive an indication of the limited period of time from the base station 105, which may be based on one or more conditions determined by, or otherwise indicated to, the base station 105, such as the speed of the UE, experienced Doppler shift, etc.

In method 500, at Block 512, the UE can communicate, using the HST configuration, one or more subsequent signals with the cell. In an aspect, communicating component 344, e.g., in conjunction with processor(s) 305, memory 302, transceiver 370, and/or configuring component 340, can communicate, using the HST configuration, one or more subsequent signals with the cell. As described, for example, where the HST activate indication is received in a MIB, communicating component 344 can receive and process SIBs in the PBCH and/or uplink or downlink data or control signals based on the HST configuration. Where the HST activate indication is received in a SIB, communicating component 344 can receive and process subsequent SIBs in the PBCH and/or uplink or downlink data or control signals based on the HST configuration. Where the HST activate indication is received in a downlink control signal (e.g., in a DCI format), communicating component 344 can receive and process subsequent control or data signals based on the HST configuration. For example, where the HST configuration corresponds to modifying a DM-RS density, communicating component 344 can transmit DM-RS according to the modified density at least while the HST configuration is activated. As described, this may include using additional symbols in a slot or subframe to transmit DM-RS, using additional subcarriers in a symbol to transmit DM-RS, and/or the like. Parameters indicating the DM-RS density, the specific symbols of a slot/subframe over which to transmit DM-RS, the specific subcarriers of a symbol over which to transmit DM-RS in symbols configured for a slot/subframe, etc. may be indicated in the HST configuration known by, or otherwise configured for, the UE 115, as described. Moreover, for example, communicating component 344 can communicate based on the HST configuration for the limited period of time as determined by UE 115, received from the base station 105, etc.

Figure 6:
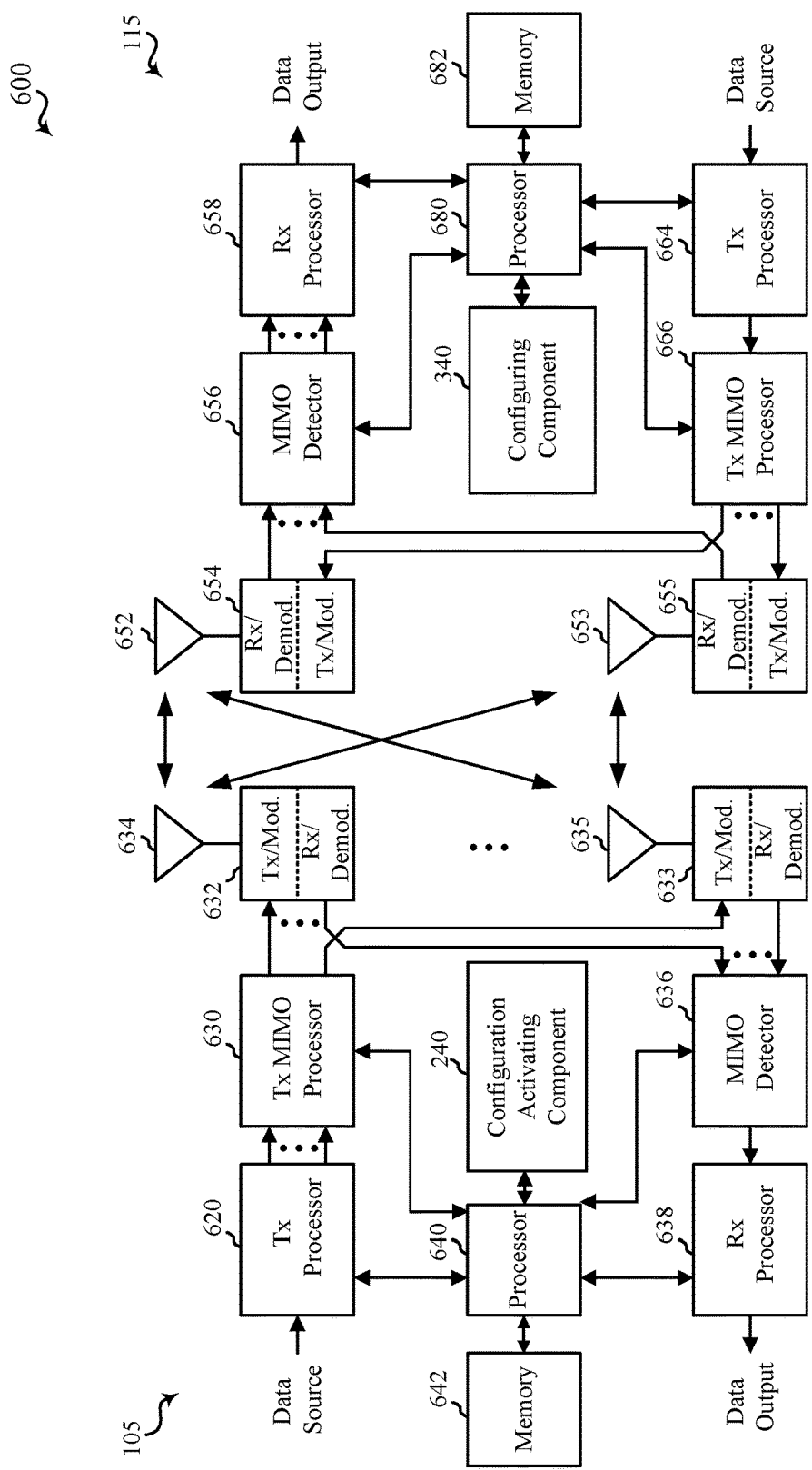
FIG. 6 is a block diagram illustrating an example of a MIMO communication system including a base station and a UE, in accordance with various aspects of the present disclosure.

FIG. 6 is a block diagram of a MIMO communication system 600 including a base station 105 and a UE 115. The MIMO communication system 600 may illustrate aspects of the wireless communication system 100 described with reference to FIG. 1. The base station 105 may be an example of aspects of the base station 105 described with reference to FIGS. 1, 2, and 3. The base station 105 may be equipped with antennas 634 and 635, and the UE 115 may be equipped with antennas 652 and 653. In the MIMO communication system 600, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 115 may be an example of aspects of the UEs 115 described with reference to FIGS. 1, 2, and 3. At the UE 115, the UE antennas 652 and 653 may receive the DL signals from the base station 105 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 115 to a data output, and provide decoded control information to a processor 680, or memory 682.

The processor 680 may in some cases execute stored instructions to instantiate a configuring component 340 (see e.g., FIGS. 1 and 3).

On the uplink (UL), at the UE 115, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 105 in accordance with the communication parameters received from the base station 105. At the base station 105, the UL signals from the UE 115 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuration activating component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for activating a high speed train (HST) configuration for communicating with a cell in a HST based communications environment, comprising:

receiving, by a user equipment (UE) from the cell, a physical broadcast channel signal with a master information block (MIB) including an HST activate indication to activate a HST configuration;

activating, by the UE based at least in part on the HST activate indication, the HST configuration; and communicating, by the UE based at least in part on the HST activate indication, one or more subsequent signals with the cell using the HST configuration.

2. The method of claim 1, wherein the HST configuration indicates a demodulation reference signal (DM-RS) pattern, wherein communicating the one or more subsequent signals includes receiving, from the cell, one or more subsequent signals with one or more system information blocks (SIBs), and further comprising processing the one or more subsequent signals based on a DM-RS received according to the DM-RS pattern.

3. The method of claim 1, further comprising receiving a SIB which includes a second HST activate indication, and further comprising communicating one or more subsequent downlink control channel or downlink shared data channel signals transmitted by the cell based on the second HST activate indication.

4. The method of claim 1, further comprising receiving a downlink control information (DCI) message in a downlink control channel which includes a second HST activate indication, and further comprising communicating one or more subsequent downlink shared data channel signals transmitted by the cell based on the second HST activate indication.

5. The method of claim 4, wherein the second HST activation indication corresponds to a limited time period for which a second HST configuration is activated, after which the second HST configuration is deactivated for communicating, by the UE, with the cell or one or more other cells.

6. The method of claim 5, wherein the limited time period is one or more subframes, one or more slots, or one or more symbols.

7. The method of claim 5, further comprising reporting a UE condition to the cell, wherein the limited time period is determined based at least in part on the UE condition.

8. The method of claim 1, wherein the HST configuration indicates a demodulation reference signal (DM-RS) pattern that includes more frequency resources per period of time than a non-HST DM-RS pattern, and further comprising processing the one or more subsequent signals based on the DM-RS pattern indicated in the HST configuration.

9. The method of claim 8, further comprising receiving the one or more subsequent signals as single frequency network signals from a plurality of remote radio heads (RRHs).

10. The method of claim 9, further comprising receiving independent tracking reference signals from the plurality of RRHs for determining Doppler tracking for each of the plurality of RRHs.

11. A method for activating a high speed train (HST) configuration for communicating with a cell on a HST, comprising:
    transmitting, from a cell to a user equipment (UE), a physical broadcast channel signal with a master information block (MIB) including an HST activate indication to activate a HST configuration; and
    communicating, by the cell with the UE, one or more subsequent signals based on the HST configuration.

12. The method of claim 11, wherein the HST configuration indicates a demodulation reference signal (DM-RS) pattern, wherein communicating the one or more subsequent signals includes transmitting, to the UE, the one or more subsequent signals with one or more system information blocks (SIBs), and further comprising transmitting, to the UE and based on the DM-RS pattern, one or more DM-RSs for processing the one or more subsequent signals.

13. The method of claim 11, further comprising transmitting a system information block (SIB) which includes a second HST activate indication, and further comprising communicating one or more subsequent downlink control channel or downlink shared data channel signals based on the second HST activate indication.

14. The method of claim 11, further comprising transmitting a downlink control information (DCI) message indicated in a downlink control channel which includes a second HST activate indication, and further comprising communicating one or more subsequent downlink shared data channel signals based on the second DST activate indication.

15. The method of claim 14, wherein the second HST activate indication corresponds to a limited time period for which a second HST configuration is activated.

16. The method of claim 15, wherein the limited time period is one or more of one or more subframes, one or more slots, or one or more symbols.

17. The method of claim 15, further comprising:
    receiving a condition from the UE; and
    determining the limited time period based at least in part on the condition.

18. The method of claim 11, wherein the HST configuration indicates a demodulation reference signal (DM-RS) pattern that includes more frequency resources per period of time than a non-HST DM-RS pattern used in transmitting non-HST signals.

19. The method of claim 18, wherein transmitting the one or more subsequent signals comprises transmitting the one or more subsequent signals as single frequency network signals from a plurality of remote radio heads (RRHs).

20. An apparatus for activating a high speed train (HST) configuration for communicating with a cell in a HST based communications environment, comprising:
    a transceiver for communicating one or more wireless signals via one or more antennas;
    a memory configured to store instructions; and
    one or more processors communicatively coupled with the transceiver and the memory, wherein the one or more processors are configured to:
        receive, from the cell, a physical broadcast channel signal with a master information block (MIB) including an HST activate indication to activate a HST configuration;
        activate, based at least in part on the HST activate indication, the HST configuration; and
        communicate, based at least in part on the HST activate indication, one or more subsequent signals with the cell using the HST configuration.

21. The apparatus of claim 20, wherein the HST configuration indicates a demodulation reference signal (DM-RS) pattern, wherein the one or more processors communicate one or more subsequent signals at least in part by receiving, from the cell, one or more subsequent physical broadcast channel signals with one or more system information blocks (SIBS), and wherein the one or more processors are further configured to process the one or more subsequent signals based on a DM-RS received according to the DM-RS pattern.

22. The apparatus of claim 20, wherein the one or more processors are further configured to receive a SIB which includes a second HST activate indication, and wherein the one or more processors are further configured to communicate one or more subsequent downlink control channel or downlink shared data channel signals transmitted by the cell based on the second HST activate indication.

23. The apparatus of claim 20, wherein the one or more processors are further configured to receive a downlink control information (DCI) message in a downlink control channel which includes a second HST activate indication, and wherein the one or more processors are further configured to communicate one or more subsequent downlink shared data channel signals transmitted by the cell based on the second HST activate indication.

24. The apparatus of claim 23, wherein the second HST activate indication corresponds to a limited time period for which a second HST configuration is activated, after which the second HST configuration is deactivated for communicating, by the UE, with the cell or one or more other cells.

25. The apparatus of claim 20, wherein the HST configuration indicates a demodulation reference signal (DM-RS) pattern that includes more frequency resources per period of time than a non-HST DM-RS pattern, and further comprising processing the one or more subsequent signals based on the DM-RS pattern indicated in the HST configuration.

26. An apparatus for activating a high speed train (HST) configuration for communicating with a cell on a HST, comprising:
    a transceiver for communicating one or more wireless signals via one or more antennas;
    a memory configured to store instructions; and
    one or more processors communicatively coupled with the transceiver and the memory, wherein the one or more processors are configured to [cause the apparatus to]:
        transmit, to a user equipment (UE), a physical broadcast channel signal with a master information block (MIB) including an HST activate indication to activate a HST configuration; and
        communicate, with the UE, one or more subsequent signals based on the HST configuration.

27. The apparatus of claim 26, wherein the HST configuration indicates a demodulation reference signal (DM-RS) pattern, wherein the one or more processors are configured to communicate the one or more subsequent signals at least in part by transmitting, to the UE the one or more subsequent signals with one or more system information blocks (SIBs), and wherein the one or more processors are further configured to transmit, to the UE and based on the DM-RS pattern, one or more DM-RSs for processing the one or more subsequent signals.

28. The apparatus of claim 26, wherein the one or more processors are further configured to transmit a system information block (SIB) which includes a second HST activate indication, and wherein the one or more processors are further configured to communicate one or more subsequent downlink control channel or downlink shared data channel signals based on the second HST activate indication.

29. The apparatus of claim 26, wherein the one or more processors are further configured to transmit a downlink control information (DCI) message indicated in a downlink control channel which includes a second HST activate indication, and wherein the one or more processors are further configured to communicate one or more subsequent downlink shared data channel signals based on the second HST activate indication.

30. The apparatus of claim 26, wherein the HST configuration indicates a demodulation reference signal (DM-RS) pattern that includes more frequency resources per period of time than a non-HST DM-RS pattern used in transmitting non-HST signals.

* * * * *